United States Patent
Shinde

(10) Patent No.: US 9,910,929 B2
(45) Date of Patent: Mar. 6, 2018

(54) WEB BROWSER-BASED CONTENT MANAGEMENT SYSTEM

(71) Applicant: International Business Machines Corporation, Armonk, NY (US)

(72) Inventor: Suraj Shinde, Ignacio Zaragoza (MX)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 634 days.

(21) Appl. No.: 13/659,133

(22) Filed: Oct. 24, 2012

(65) Prior Publication Data

US 2014/0115136 A1  Apr. 24, 2014

(51) Int. Cl.
| | |
|---|---|
| *G06F 15/16* | (2006.01) |
| *G06F 17/30* | (2006.01) |
| *H04L 29/08* | (2006.01) |
| *H04L 29/06* | (2006.01) |

(52) U.S. Cl.
CPC ........ *G06F 17/30893* (2013.01); *H04L 29/06* (2013.01); *H04L 29/08072* (2013.01); *H04L 67/02* (2013.01)

(58) Field of Classification Search
CPC .... H04L 29/06; H04L 29/08072; G06F 21/31
USPC ............................ 709/220, 224, 229; 705/79
See application file for complete search history.

(56) References Cited

U.S. PATENT DOCUMENTS

| | | | |
|---|---|---|---|
| 6,804,674 B2 | 10/2004 | Hsiao et al. | |
| 7,343,554 B2 | 3/2008 | Waldorf et al. | |
| 7,523,403 B2 | 4/2009 | Karatal et al. | |
| 7,660,902 B2* | 2/2010 | Graham et al. | ............... 709/229 |
| 8,060,828 B2* | 11/2011 | Griffith | .................. G06Q 30/02 |
| | | | 715/738 |
| 8,458,099 B2* | 6/2013 | Shear et al. | ..................... 705/79 |
| 8,533,860 B1* | 9/2013 | Grecia | ............. 726/29 |
| 8,549,622 B2* | 10/2013 | Byrne | ................ G06F 21/6218 |
| | | | 713/187 |
| 8,613,048 B2* | 12/2013 | Braddy | ................... G06F 21/31 |
| | | | 726/14 |

(Continued)

FOREIGN PATENT DOCUMENTS

| | | |
|---|---|---|
| EP | 1341100 A1 | 9/2003 |
| WO | WO2008091912 A2 | 7/2008 |

OTHER PUBLICATIONS

Jacob Wright, "Client-side-only Javascript Amazon S3 CMS", (downloaded from the Internet Jun. 19, 2012), <URL: http://jacwright.com/556/client-side-only-javascript-amazon-s3-cms/>.
"List of Content Management Systems", (downloaded from the internet Jun. 19, 2012), all pages, <URL: http://en.wikipedia.org/wiki/List_of_content_management_systems>.

(Continued)

*Primary Examiner* — Khanh Dinh
(74) *Attorney, Agent, or Firm* — Law Offices of Ira D. Blecker, P.C.

(57) ABSTRACT

A web browser-based content management system which includes a web browser; a web server engine embedded into the web browser so that the web browser has web server functionality, the web server engine having web server, database and scripting language components; and a content management system to support the creation, collection, management and publication of digital content, the content management system deployed on the web browser embedded web server to provide a web browser-based content management system. Also included is a browser to browser content sharing system.

11 Claims, 3 Drawing Sheets

(56) References Cited

U.S. PATENT DOCUMENTS

| | | | |
|---|---|---|---|
| 8,918,380 B2* | 12/2014 | Sjogren | G06F 17/30575 707/703 |
| 9,660,809 B2* | 5/2017 | Krapf | H04L 9/3234 |
| 9,774,622 B2* | 9/2017 | Krapf | H04L 63/1466 |
| 2001/0049632 A1* | 12/2001 | Rigole | 705/26 |
| 2007/0067338 A1* | 3/2007 | Koizumi et al. | 707/104.1 |
| 2009/0070413 A1* | 3/2009 | Priyadarshan et al. | 709/203 |
| 2009/0129402 A1* | 5/2009 | Moller et al. | 370/458 |
| 2010/0250756 A1 | 9/2010 | Morris | |
| 2011/0258136 A1 | 10/2011 | Adhiraju et al. | |
| 2011/0258526 A1 | 10/2011 | Supakkul et al. | |
| 2011/0302053 A1* | 12/2011 | Rigole | 705/26.41 |
| 2012/0005187 A1 | 1/2012 | Chavanne | |
| 2013/0035164 A1* | 2/2013 | Osvald | A63F 13/12 463/42 |

OTHER PUBLICATIONS

"Doculex—Document and File Management Software" (downloaded from the Internet Jun. 19, 2012), all pages, <URL: http://www.doculex.com/>.

"Opera Unite", (downloaded from the Internet Jun. 19, 2012), all pages, <URL: http://unite.opera.com/overview/>.

Brad Neuberg et al., "Paper Airplane and the Two Way Web", (dowloaded from the Internet Jun. 19, 2012), all pages, <URL: http://codinginparadise.org/paperairplane/>.

Andreas Mauthe et al., "Peer-to-Peer Computing: Systems, Concepts and Characteristics", Praxis in der Informationsverarbeitung (PIK), K.G. Sauer Verlag, Special Issue on Peer-to-Peer, vol. 26, No. 03/03, Jun. 2003, all pages.

"Joomla! Technical Requirements", (downloaded from the Internet Jun. 19, 2012), all pages, <URL: http://www.joomla.org/technical-requirements.html>.

* cited by examiner

WEB BROWSER-BASED CONTENT MANAGEMENT SYSTEM

BACKGROUND

The present exemplary embodiments relate to web browsers and content management systems and, more particularly, relate to a web browser having content management system functionality.

An increasing volume of content gets collected on a user's file system and a major part of this content comes from the World Wide Web (hereafter referred to as the "Web") such as attachments from Web-based email, images (photos), documents and audio/video files that may be downloaded from the web. It is difficult to keep track of every piece of content on a user's file system.

Content management is a set of processes and technologies that support the creation, collection, managing, and publishing of information in any form or medium. This information may be typically referred to as content or, in the case of Web-based content, may be referred to as digital content. Digital content may take the form of text (such as electronic documents), multimedia files (such as audio or video files), or any other file type that follows a content lifecycle requiring management.

Existing content management systems are server-based, highly centralized and based on heavy-weight systems. Moreover, the existing content management systems don't communicate and share content with other content management systems.

BRIEF SUMMARY

The various advantages and purposes of the exemplary embodiments as described above and hereafter are achieved by providing, according to a first aspect of the exemplary embodiments, a web browser-based content management system including: a web browser; a web server engine embedded into the web browser so that the web browser has web server functionality, the web server engine having web server, database and scripting language components; and a content management system to support the creation, collection, management and publication of digital content, the content management system deployed on the web browser having the embedded web server engine to provide a web browser-based content management system.

According to a second aspect of the exemplary embodiments, there is provided a method for a web browser-based content management system including: providing a web browser; embedding a web server engine into the web browser so that the web browser has web server functionality, the web server engine having web server, database and scripting language components; developing a content management system using the scripting language, the content management system to support the creation, collection, management and publication of digital content; and deploying the content management system on the web browser having the embedded web server engine to provide a web browser-based content management system; wherein the method is implemented on one or more computing devices.

According to a third aspect of the exemplary embodiments, there is provided a computer program product for a web browser-based content management system including: a nontransitory computer readable storage medium having computer readable program code embodied therewith. The computer readable program code including: computer readable program code configured to provide a web browser; computer readable program code configured to embed a web server engine into the web browser so that the web browser has web server functionality, the web server engine having web server, database and scripting language components; computer readable program code configured to develop a content management system using the scripting language, the content management system to support the creation, collection, management and publication of digital content; and computer readable program code configured to deploy the content management component on the web browser having the embedded web server engine to provide a web browser-based content management system.

According to a fourth aspect of the exemplary embodiments, there is provided a browser to browser content sharing system including: a plurality of web browser-based content management systems. Each web browser-based content management system including: a web browser; a web server engine embedded into the web browser so that the web browser has web server functionality, the web server engine having web server, database and scripting language components; and a content management system to support the creation, collection, management and publication of digital content, the content management system deployed on the web browser having the embedded web server engine to provide a web browser-based content management system; and a communication protocol to communicate from one web browser-based content management system to another web browser-based content management system; and a content sharing/searching/sending system to exchange digital content between one web browser-based content management system and another web browser-based content management system using the communication protocol.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The exemplary embodiments pertain to a Web browser-based content management system and browser-to-browser content sharing system which allows Web browsers to serve as content management systems and share content directly with other Web browsers. With the exemplary embodiments, the full content management lifecycle is supported in the Web browser and includes a full set of content management processes and procedures.

With the exemplary embodiments, content management processes can run with a single Web browser or across Web browsers. In addition, the Web browser-based content management system can integrate with traditional content management systems that are server driven.

The exemplary embodiments are unique in that the full content management system is supported and runs in the Web browser.

The exemplary embodiments are advantageous in the following ways:

The content management system is light-weight. A Web browser-based content management system requires almost no technical skill or knowledge to manage.

The content management system is decentralized and completely removes the dependency on central servers. End users can run their workflows from their own browsers, which grant them a certain level of independence from information technology departments.

The content management system is scalable and highly available by adding multiple Web browsers with redundant processes to the system. Also, the content management system is compatible with traditional content management approaches and complements existing server-based content management systems by integration with existing content management systems.

Figure 1:
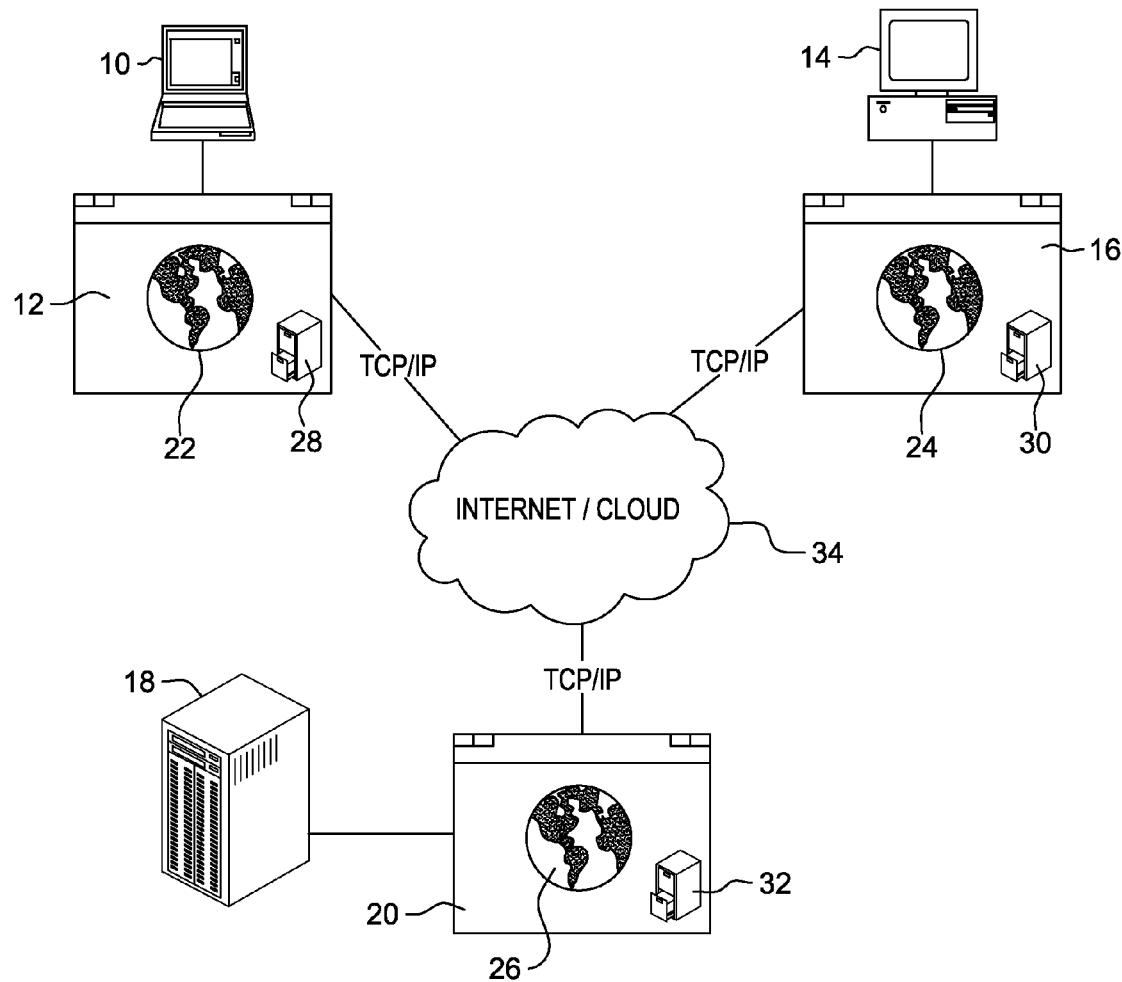
FIG. 1 illustrates the operating environment for the exemplary embodiments.

Referring to the drawings in more detail, and particularly referring to FIG. 1, there is shown a typical environment for the exemplary embodiments. Essentially every computer these days has a Web browser for exploring the internet for business, enjoyment, research or just to seek out information on some subject. The Web is just a subset of the internet. FIG. 1 shows laptop 10 may have a Web browser 12, personal computer 14 may have a Web browser 16 and desktop computer 18 may have a Web browser 20. The Web browsers 12, 16, 20 may be any of the commonly available Web browsers such as Firefox, Internet Explorer, Opera, Chrome and Safari.

Presently, a Web browser is distinguishable from a Web server and a Web browser does not include the functionality of a Web server.

A Web server conventionally delivers Web content that can be accessed through the Internet. The primary function of a Web server is to deliver web pages on the request to clients. A Web browser initiates communication by making a request for a specific resource and the Web server responds with the content of that resource or an error message if unable to do so. A Web server may also include receiving content from clients.

A Web browser is a software application for retrieving, presenting, and traversing information resources on the Web. Although Web browsers are primarily intended to use the Web, they can also be used to access information provided by web servers in private networks or files in file systems.

Each of the Web browsers 12, 16, 20 may include a Web server engine, schematically indicated as 22 in Web browser 12, 24 in Web browser 16 and 26 in Web browser 20. The Web server engine 22, 24, 26 embodies Web server functionality in Web browser 12, 16, 20 so that Web browser 12, 16, 20 may act as a server even though it is not a server.

The Web server engine 22, 24, 26 may be embedded in the Web browser 12, 16, as a plug-in. A plug-in is a set of software components that may add specific abilities to a larger software application. The plug-in enables customizing the functionality of an application. In the present exemplary embodiments, the Web server engine 22, 24, 26 customizes the functionality of the Web browser 12, 16, 20 to add Web server functionality to it.

There are several well-known software packages that form the basis of a Web server engine. These software packages are tailored to the operating system of the computer on which the Web browser is located and may include an Apache HTTP Server, MySQL database and PHP, a general-purpose server-side scripting language, the principal components to build a viable general purpose web server. Some of these software packages may include the Perl or Python high level programming language instead of PHP. For Windows operating systems, the Web server engine may be abbreviated as WAMP. Similarly, for Linux and Macintosh operating systems, the Web server engine may be abbreviated as LAMP and MAMP, respectively.

Each of the Web browsers 12, 16, 20 may further include a content management system schematically illustrated as 28, 30, 32, respectively, in FIG. 1. The content management system 28, 30, 32 may be developed in the PHP scripting language or other similar scripting language. The content management system 28, 30, 32 may use the Web browser-embedded MySQL database for storing content and data.

Alternatively, a Web server-based content management system may be adapted for use in the Web browsers 12, 16, 20. One such Web server-based content management system is Joomla! (www.joomla.org). Joomla! is an open source content management system which may be downloaded from the Internet. There are many other Web server-based content management systems commonly available.

It should be understood that Web browser-based in the exemplary embodiments refers to a totally browser-based implementation. This should be distinguished from browser-based implementations which actually offer only a Web browser-based interface while the solution is deployed on servers on the internet or the cloud. In the present exemplary embodiments, the content management system is deployed and runs on the Web browser itself, is embedded as part of the Web browser and there is no part of the content management system on any Web server locally or in the internet or the cloud.

Web browsers 12, 16, 20 may directly communicate with each other over a standard TCP/IP internet protocol through the Internet 34, also referred to as the cloud.

Web browsers 12, 16, 20 additionally may share content through a content sharing/searching/sending system that is embedded in the Web browser 12, 16, 20 and uses standard communication protocols such as TCP/IP to exchange content. The content sharing/searching/sending system of the present exemplary embodiments is similar in concept to the Peer-to-Peer (P2P) solutions such as Kazaa and Bittorrent which support file sharing. However, the sharing/searching/sending system of the present exemplary embodiments is different from P2P in that the present exemplary embodiments enable not only file sharing but also content management, use standard communication protocols and are embedded in the Web browser whereas P2P solutions are independent applications not embedded in a Web browser and use specialized platforms and communication protocols.

While the Web browsers 12, 16, 20 may communicate directly with each other through internet 34 to exchange content as indicated in the exemplary embodiments, the Web browsers 12, 16, 20 may also communicate conventionally with Web servers through internet 34.

Figure 2:
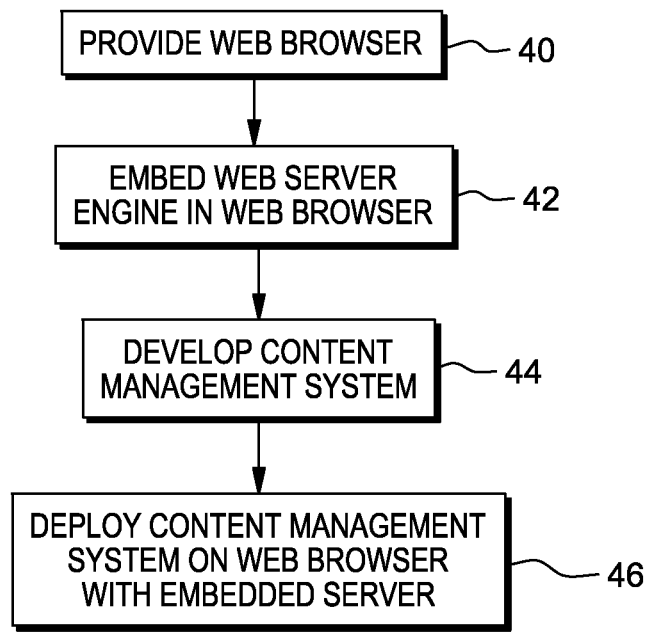
FIG. 2 is a flow chart of a method according to the exemplary embodiments.

Referring now to FIG. 2, there is described a method for a Web browser-based content management system. First, a Web browser is provided, box 40. Next, a Web server engine as described previously is embedded, preferably as a plug-in, in the Web browser, box 42. A content management system is developed using the scripting language from the Web server engine, box, 44. Finally, the content management system is deployed on the Web browser having the embedded Web server, box 46.

Figure 3:
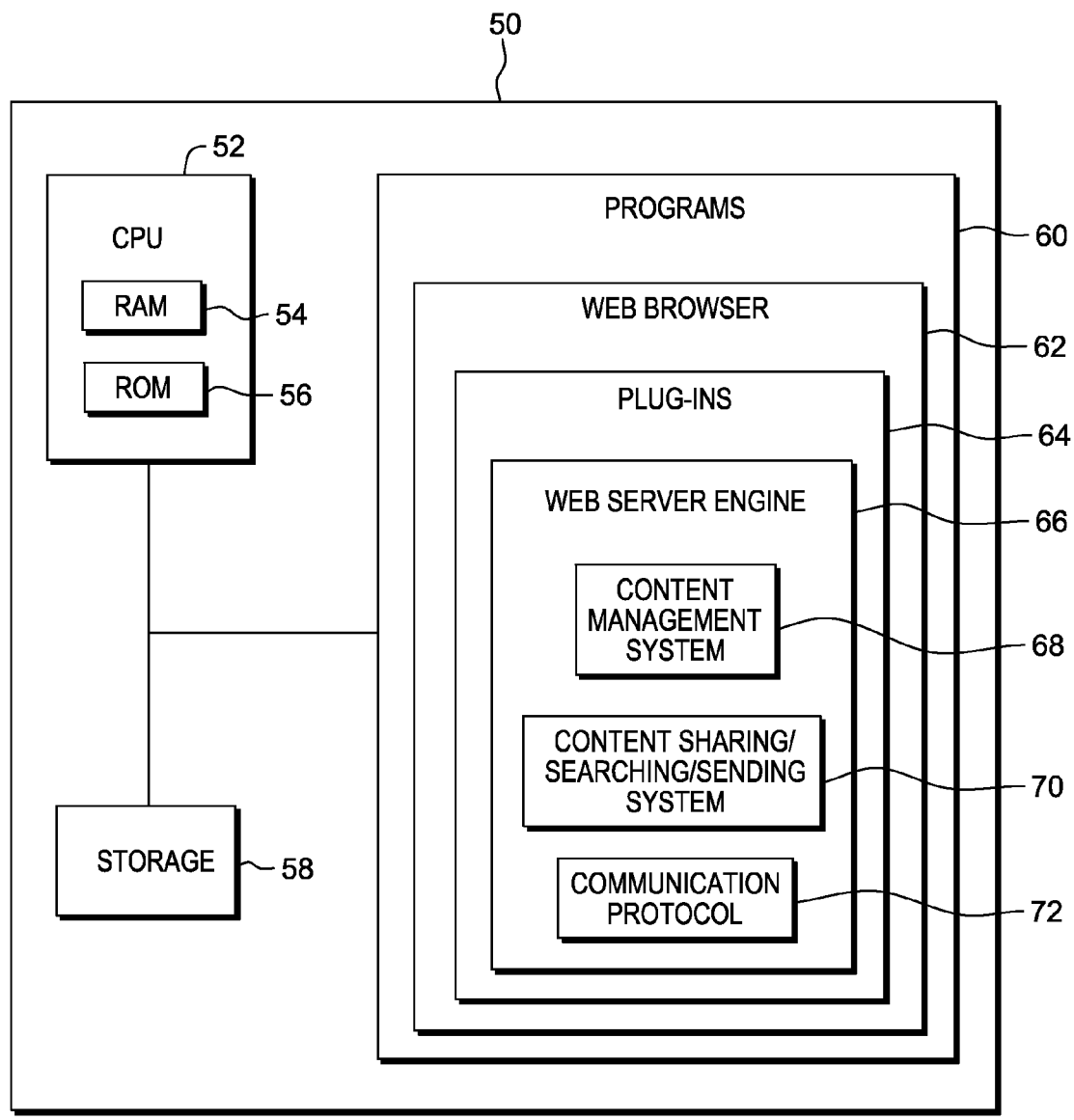
FIG. 3 is a hardware implementation of the exemplary embodiments.

Each of the Web browsers 12, 16, 20 may be implemented on one or more computing devices. One such computing device 50 is illustrated in FIG. 3. Computing device 50 may form a part of each of laptop computer 10, personal computer 14 and desktop computer 18.

Computing device 50 may include at least one central processing unit (CPU) 52, random access memory (RAM) 54 and read-only memory 56. Resident in the computing device 50, or peripheral to it, may be a storage device 58 of some type such as a hard disk, floppy disk drive, CD-ROM drive, tape drive or other storage device.

Further included in computing device 50 are program instructions 60 that may be tangibly and non-transitorily embodied in storage device 60 or peripheral thereto in another storage medium which, when read and executed by the CPU 52, cause the computing device 50 to perform the steps necessary to execute the processes of the exemplary embodiments.

Program instructions may include program instructions for a Web browser 62. Included within Web browser 62 may be program instructions for plug-ins 64, one of which may be a Web server engine 66. Included within the Web server engine 66 may be a content management system 68, a content sharing/searching/sending system 70 and a communication protocol 72, such as TCP/IP or any specialized protocol wrapped on top of TCP/IP.

Computing device 50 may include other components not germane to the present exemplary embodiments and thus are not shown for clarity.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A web browser-based content management system comprising:
   a web browser to facilitate communication with a network including the web, the internet and private networks and to manage, via a content management system deployed within the web browser, digital content stored by the web browser within a database within the web browser;
   a web server engine embedded into the web browser so that the web browser has web server functionality to deliver web pages to the web browser, the web server engine having web server, database and scripting language components;
   the content management system to support the creation, collection, storage, management and publication of the digital content, the content management system deployed within the web browser having the embedded web server engine to provide a web browser-based content management system;
   a MySQL database within the web browser to store the digital content of the content management system deployed within the web browser in cooperation with the content management system; and
   a computing device including a central processing unit wherein the web browser, web server engine, content management system and database are all deployed on the same computing device.

2. The web browser-based content management system of claim 1 wherein the web server engine is selected from the group consisting of WAMP (Windows-based Apache HTTP Server, MySQL database and PHP server-side scripting language), LAMP (Linux-based Apache HTTP Server, MySQL database and PHP server-side scripting language) and MAMP (Macintosh-based Apache HTTP Server, MySQL database and PHP server-side scripting language).

3. The web browser-based content management system of claim 1 wherein the web browser further comprising a communication protocol for communicating directly with another web browser-based content management system to exchange digital content directly between the web browser and the another web browser-based content management system.

4. A method for a web browser-based content management system comprising:
   providing a first web browser to facilitate communication with a network including the web, the internet and private networks and to manage, via a content management system deployed within the web browser, digital content stored by the web browser within a MySQL database in the web browser;
   embedding a web server engine into the first web browser so that the first web browser has web server functionality to deliver web pages to the web browser, the web server engine having web server, database and scripting language components;
   developing the content management system using the scripting language, the content management system to support the creation, collection, storage, management and publication of the digital content; and
   deploying the content management system within the first web browser having the embedded web server engine to provide a first web browser-based content management system;
   storing within the first web browser the MySQL database to store the digital content of the content management system deployed within the web browser in cooperation with the content management system; and
   communicating by the first web browser directly with a second web browser having a second web browser-based content management system to directly exchange digital content directly between the first web browser and the second web browser;
   wherein the method is implemented on one or more computing devices.

5. The method for a web browser-based content management system of claim 4 wherein the web server engine is selected from the group consisting of WAMP (Windows-based Apache HTTP Server, MySQL database and PHP server-side scripting language), LAMP (Linux-based Apache HTTP Server, MySQL database and PHP server-side scripting language) and MAMP (Macintosh-based Apache HTTP Server, MySQL database and PHP server-side scripting language).

6. The method for a web browser-based content management system of claim 4 wherein the first web browser further comprising a communication protocol for communicating directly with the second web browser of the second web browser-based content management system.

7. A computer program product for a web browser-based content management system comprising:
   a nontransitory computer readable storage medium having computer readable program code embodied therewith, the computer readable program code comprising:
   computer readable program code configured to provide a web browser to facilitate communication with a network including the web, the internet and private networks and to manage, via a content management system deployed within the web browser, digital content stored by the web browser within a MySQL database within the web browser;
   computer readable program code configured to embed a web server engine into the web browser so that the web browser has web server functionality to deliver web pages to the web browser, the web server engine having web server, database and scripting language components;
   computer readable program code configured to develop the content management system using the scripting language, the content management system to support the creation, collection, storage, management and publication of the digital content;

computer readable program code configured to deploy the content management system within the web browser having the embedded web server engine to provide a web browser-based content management system;

computer readable program code configured to deploy the MySQL database within the web browser to store the digital content of the content management system deployed within the web browser in cooperation with the content management system; and computer readable program code configured to deploy all of the web browser, web server engine, content management system and database on the same computer readable storage medium.

8. The computer program product of claim 7 wherein the web server engine is selected from the group consisting of WAMP (Windows-based Apache HTTP Server, MySQL database and PHP server-side scripting language), LAMP (Linux-based Apache HTTP Server, MySQL database and PHP server-side scripting language) and MAMP (Macintosh-based Apache HTTP Server, MySQL database and PHP server-side scripting language).

9. The computer program product of claim 7 wherein the web browser further comprising a communication protocol for directly communicating with a web browser of another web browser-based content management system.

10. A browser to browser content sharing system comprising:
- a plurality of web browser-based content management systems, each web browser-based content management system comprising:
  - a web browser to facilitate communication with a network including the web, the internet and private networks and to manage, via a content management system deployed within the web browser, digital content stored by the web browser within a MySQL database in the web browser;
  - a web server engine embedded into the web browser so that the web browser has web server functionality to deliver web pages to the web browser, the web server engine having web server, database and scripting language components; and
  - the content management system to support the creation, collection, storage, management and publication of the digital content, the content management system deployed within the web browser having the embedded web server engine to provide a web browser-based content management system;
  - the MySQL database within the web browser to store the digital content of the content management system deployed within the web browser in cooperation with the content management system; and
  - a computing device including a central processing unit wherein the web browser, web server engine, content management system and database are all deployed on the same computing device; and
- a communication protocol to communicate directly from a first web browser of one web browser-based content management system to a second web browser of another web browser-based content management system; and
- a content sharing/searching/sending system to directly exchange digital content between the one web browser-based content management system and the another web browser-based content management system using the communication protocol.

11. The browser to browser content sharing system of claim 10 wherein the web server engine is selected from the group consisting of WAMP (Windows-based Apache HTTP Server, MySQL database and PHP server-side scripting language), LAMP (Linux-based Apache HTTP Server, MySQL database and PHP server-side scripting language) and MAMP (Macintosh-based Apache HTTP Server, MySQL database and PHP server-side scripting language).

* * * * *